United States Patent [19]
Kinto et al.

[11] Patent Number: 5,832,789
[45] Date of Patent: Nov. 10, 1998

[54] DRIVE UNIT FOR AN ELECTRIC VEHICLE

[75] Inventors: Yoshio Kinto, Okazaki; Masahiro Hasebe, Anjo, both of Japan

[73] Assignee: Aisin AW Co., Ltd., Japan

[21] Appl. No.: 774,702

[22] Filed: Dec. 26, 1996

[30] Foreign Application Priority Data

Dec. 27, 1995 [JP] Japan ................................... 7-351210

[51] Int. Cl.$^6$ ............................................... F16H 57/02
[52] U.S. Cl. ....................................... 74/606 R; 74/421 A
[58] Field of Search ........................... 74/606 R, 421 A

[56] References Cited

U.S. PATENT DOCUMENTS

| | | | |
|---|---|---|---|
| 2,708,851 | 5/1955 | Moerk | 74/421 A |
| 2,771,786 | 11/1956 | Gilbert et al. | 74/606 R |
| 3,434,366 | 3/1969 | Raso et al. | 74/421 A |
| 4,147,071 | 4/1979 | Scribner et al. | 74/421 A |
| 5,095,767 | 3/1992 | Spridco | 74/606 R X |
| 5,295,413 | 3/1994 | Sherman | 74/606 |

*Primary Examiner*—Vinh T. Luong
*Attorney, Agent, or Firm*—Lorusso & Loud

[57] ABSTRACT

A motor casing containing a motor has an end wall with bosses and bolt receiving holes positioned radially inward relative to a stator mounted in a circumferential wall of the motor casing. A gear unit with a gear casing includes bosses and bolt holes on its periphery mating with bosses and bolt receiving holes of the motor casing to thus enable a substantial reduction in size and weight of the gear casing.

5 Claims, 3 Drawing Sheets

DRIVE UNIT FOR AN ELECTRIC VEHICLE

BACKGROUND OF THE INVENTION

1. Field of the Invention

The present invention relates to a drive train for an electric vehicle, more specifically to a connecting casing structure joining a motor casing and a gear casing housing, respectively, a motor and a gear unit.

2. Description of Prior Art

In a conventional drive train for an electric vehicle, the motor is combined with a gear unit which transmits power generated by the motor to wheels.

In this type of drive train, although the motor and the gear unit may be installed in a common casing, it is more advantageous to install the motor and the gear unit respectively in separate casings, in view of efficiency in installation and subsequent maintenance. An example of a drive unit housed in separate casings is disclosed in U.S. Pat. No. 5,295,413, in which a motor casing for accommodating a motor and a gear casing for accommodating a gear unit are provided separately, and the mating surfaces of the two casings are joined to each other by a socket-and-spigot joint having a diameter substantially equal to the outer diameter of the motor casing, and the engaged portions are sealed around the circumference thereof. Thus, a plurality of fastening flanges are formed on the motor casing in such a manner to project from the circumferential surface thereof, and the flanges are fastened with bolts to a gear casing, whose diameter is larger than that of the motor casing.

The current trend in the industry is toward reduction of the overall dimension and weight of the drive unit, with a view to facilitating installation and achieving longer mileage based on substantial reduction in power consumption. In the light of such demands, the above-described conventional design is disadvantageous in that the overall weight of the drive unit is increased by the relatively large gear casing. This is because the circumferential wall of the motor casing defining the outer diameter thereof is positioned with respect to the gear casing with the aid of a socket-and-spigot joint, and because that portion of the gear casing, which surrounds the circumference of a rotor-shaft-side gear having a relatively small diameter substantially equal to that of the rotor shaft, must be enlarged to mate with the motor casing, which enlargement is intrinsically unnecessary for merely housing the small gear. Another factor preventing reduction of the size of the gear casing is the need to provide fastening flanges projecting from the outer circumference of the gear casing for mating with the fastening flanges on the side of the motor casing.

SUMMARY OF THE INVENTION

Thus it is an object of the present invention to provide a drive train for an electric vehicle for which efficiency in terms of installation and maintenance is substantially enhanced by forming motor and gear casings separately with their overall dimensions and weight reduced by appropriate modifications to the conventional structure connecting the casings.

In order to achieve the above object, the present invention provides a drive train for an electric vehicle including a motor having a stator fixed to the circumferential wall of a motor casing and a rotor disposed radially inwardly of the stator and mounted on a rotor shaft supported by end walls of the motor casing. A gear unit is installed in a gear casing separate from the motor casing and is designed to transmit torque from the rotor shaft to the vehicle wheels. The gear unit includes at least a rotor-shaft-side transmission element whose diameter is smaller than that of the rotor of the motor and a large-diameter transmission element which is drivably connected to the rotor-shaft-side transmission element and is supported by a transmission shaft parallel to the rotor shaft. The motor casing is provided with at least one fastening portion formed on the end wall thereof and radially inwardly of the stator. The gear casing is provided with at least one fastening portion formed on a circumferential wall portion thereof which surrounds and is contoured to the outer circumference of the rotor-shaft-side transmission element on the opposite end of the transmission shaft relative to the rotor shaft. The motor and gear casings are joined to each other by fastening the fastening portions of the end wall of the motor casing to the aforementioned circumferential wall portion of the gear casing with the aid of fastening means, i.e. bolts.

According to the present invention, as described above, the motor casing is provided with at least one fastening portion formed in a space defined radially inward of the stator on the end wall of the motor casing, more specifically, radially inward of a coil end of the stator. The gear casing is provided with at least one fastening portion formed on a circumferential wall portion which surrounds the outer circumference of the rotor-shaft-side transmission element on the end of the transmission shaft opposite the rotor shaft, and the motor and gear casings are connected to each other by fastening the fastening portions together with the aid of a fastening means. Accordingly, it is possible to substantially decrease the dimension of the gear casing where it surrounds the rotor-shaft-side transmission element, and to thereby allow reduction of the overall dimensions and weight of the drive unit.

DESCRIPTION OF THE PREFERRED EMBODIMENT

Figure 1:
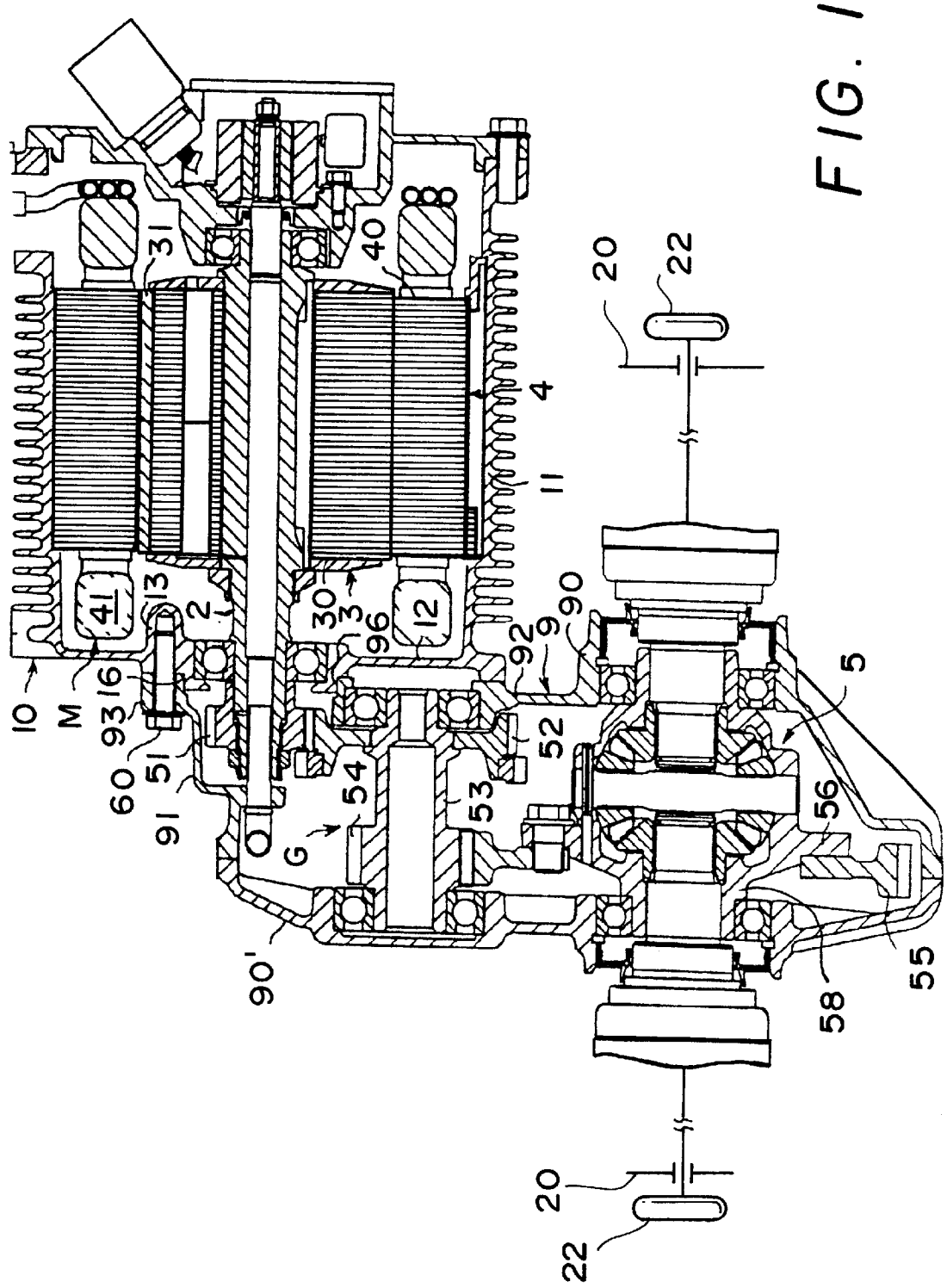
FIG. 1 is an axially extending cross-sectional view taken at line 1—1 in FIG. 3 of an electric motor drive train for an electric vehicle according to an embodiment of the present invention.

An embodiment of the present invention will be described with reference to the accompanying drawings. First, a schematic outline of the present embodiment will be explained. As shown in the axial cross-sectional view of FIG. 1, a drive train for an electric vehicle 20 includes a motor M which having a stator 4 fixed to a circumferential wall 11 of a motor casing 10 and a rotor 3 disposed radially inwardly of the stator 4. The rotor 3 is mounted on a rotor shaft 2 extending through an end wall 12 of the motor casing 10 for connection with a gear unit G which is housed in a gear casing 9 separate from the motor casing 10 and which transmits torque of the rotor shaft 2 to wheels 22. The gear unit G includes at least a rotor-shaft-side transmission element (gear) 51 whose diameter is smaller than that of the rotor 3 of the motor M, and a large-diameter transmission element (gear) 52 which is supported by a transmission shaft 53, arranged parallel to the rotor shaft 2, in meshing engagement with element 51.

Figure 2:
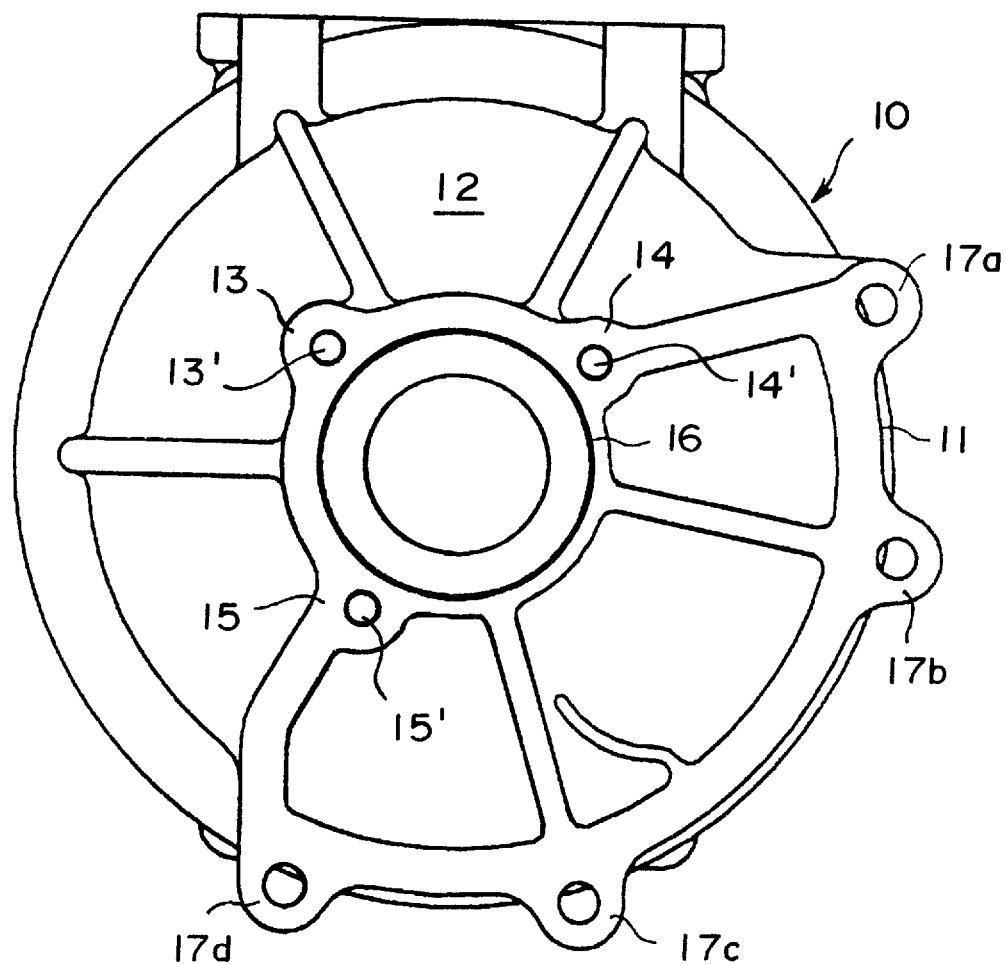
FIG. 2 is a side view showing the end wall of a motor casing housing the motor of the drive train.

Referring to the side view of FIG. 2, the motor casing 10 is provided with fastening portions 13, 14, and 15 formed radially inwardly of the stator 4 on the end wall of the motor casing 10. As further shown in FIG. 3, the gear casing 9 is provided with fastening portions 93, 94, and 95 formed on a circumferential wall portion 91 (see FIG. 1) which surrounds and is contoured to the outer circumference of the rotor-shaft-side transmission element (gear) 51 and is located opposite the transmission shaft 53 with respect to the rotor shaft 2. The motor casing 10 and the gear casing 9 are connected to each other by fastening the fastening portions 13, 14, and 15 of the end wall 12 of the motor casing 10 to the fastening portions 93, 94, and 95 of the circumferential wall 91 of the gear casing 9 by fastening means, e.g. bolts 60 (FIG. 1).

The respective components will now be described in detail referring again to FIG. 1. A DC brushless motor is employed as the motor M in this embodiment and includes a stator 4 having a core 40 of laminated electromagnetic steel sheets and a coil passing through a slot in the laminated core 40 with coil ends 41 wound around the stator 4 at axially opposed ends thereof. The stator is fixed to the inner surface of the circumferential wall 11 of the motor casing 10 by means of a key or the like. A rotor 3 includes a core 30 which is also formed as a composite or laminate electromagnetic steel sheets and is fixed to a rotor shaft 2 by means of a key. A plurality of permanent magnets 31, corresponding to the number of poles, are arranged around the outer circumference of the laminated core 30. The rotor is rotatably supported by the rotor shaft 2 radially inwardly of the stator 4 with both ends of the rotor shaft 2 supported by the motor casing 10 through bearings. Further, one end of the rotor shaft 2 projects through the end wall 12 of the motor casing 10 and serves as an output shaft for the motor.

In this embodiment, the gear unit G has three shafts, namely, the rotor shaft 2 as a first shaft, a transmission or counter shaft 53 as a second shaft, and a differential shaft 58 as a third shaft. A small-diameter gear 51 constituting the rotor-shaft-side transmission element is fitted on and fixed to an axial end of the rotor shaft 2. A large-diameter gear 52, which is mounted on and fixed to the counter shaft and which constitutes the large-diameter transmission element, is meshed with and driven by the small-diameter gear 51. The countershaft 53 is rotatably supported at its opposite ends by the gear casing 9 through bearings. The small-diameter gear 54, integrally formed with the countershaft 53, is engaged with a ring gear 55, which is fixed to the outer circumference of a differential casing 56 of differential 5 connected to the wheels 22.

The end wall 12 of the cylindrically shaped motor casing 10 is provided with a projecting spigot 16 which forms a socket-and-spigot joint and has a diameter slightly larger than the outer diameter of the bearing which supports the rotor shaft 2. The fastening portions 13, 14 and 15 shown in FIG. 2 (only the fastening portion 13 is shown in FIG. 1) are each in the form of a boss 13, 14 and 15 having a hole 13', 14' and 15' through which a bolt is passed and having a thickness greater than the other portions of the end wall 12. Although the aforementioned fastening portions 13, 14, and 15 project inside the casing 10 in order to ensure a thickness sufficient for properly supporting a bolt 60, it is unnecessary to increase the outer diameter of the casing 10, because the portions 13, 14, and 15 are arranged radially inwardly of the coil end 41 of the stator 4 and within a space defined axially outward of the end surface of the rotor 3. In addition, the motor casing 10 is provided at its portion overlapping end wall 92 of the casing 9 with further fastening portions, which are embodied as four flanges 17a through 17d projecting from the circumferential wall 11 of the casing 10 as shown in FIG. 2 and arranged along the outer circumference of the casing 10, each having a hole through which a bolt is passed.

Figure 3:
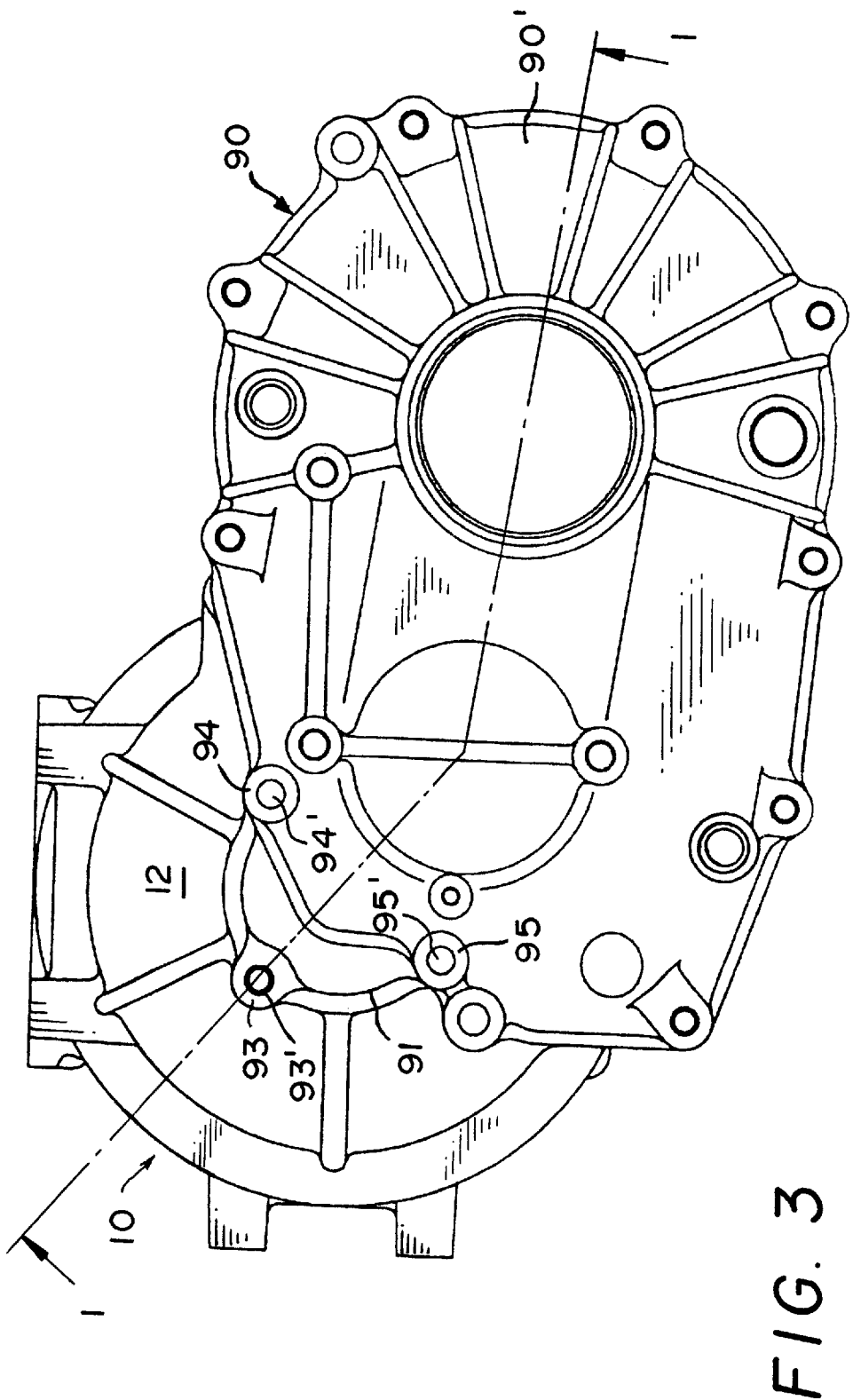
FIG. 3 is a side view showing the external appearance of the drive train.

The gear casing 9 includes a casing body 90 and a cover 90'. The mating portion of the casing body 90 which connects to the motor casing 10 is provided with a socket 96 to receive the aforementioned spigot 16 to form a socket-and-spigot joint. Also, as shown in FIG. 3, the gear casing body 90 is provided with the fastening parts such as bosses 93, 94 and 95 each having a hole 93', 94' and 95' through which a bolt is passed into the corresponding fastening portions 13, 14, and 15 of the motor casing 10. The fastening portion 93, which is located furthest from the counter shaft 53 among the fastening portions 93, 94, and 95, is arranged radially outward of the casing body 90 in the form of a flange projecting therefrom. On the other hand, the other fastening portions 94 and 95 are thickened wall portions of the cover 90' and the circumferential wall 91 of the casing body 90.

The motor and gear casings 10 and 9 thus constructed are centered with respect to each other and then connected by fitting the spigot 16 into the socket 96 as described above. Thus, a high degree of precision is attained in terms of the engagement between the small-diameter gear 51 and the large-diameter gear 52 of the counter shaft. The fastening portions 93, 13 are fastened with a bolt 60, the fastening portions 94, 14 and 95, 15 are fastened from the cover 90' side each with a through bolt (not shown) for fastening together the cover 90' and the casing body 90, and the flanges 17a through 17d are fastened each with a bolt screwed into a threaded hole of the casing body 90 from the motor casing 10 side. Thus, the motor casing 10 and the gear casing 9 are connected to each other by bolting the seven fastening portions thereof. It should be noted that the eight threaded holes arranged along the cover 90' as shown in FIG. 3 are intended to fasten the casing body 90 and the cover 90' from the casing body 90 side by passing bolts therethrough.

As described in detail in the foregoing, in this embodiment, since the bolt 60 for connecting the motor casing 10 to the gear casing 9 is radially inward of the coil end 41, regardless of the outer diameter of the motor M it is possible to reduce the dimension of the connecting surface in the vicinity of the rotor shaft 2. In addition, even in the case where the outer diameter of the motor M is changed while the output thereof remains unchanged, this embodiment is advantageous in that the gear casing 9 can be connected without modification. Furthermore, since the centering of the motor casing 10, that is the rotor shaft 2, with respect to the gear casing 9 is achieved by means of a spigot-and-socket joint of small-diameter portions which ensure a high degree of precision, no special positioning operation, using a knock pin or the like, is necessary. Thus, it is advantageous that the connection between the casings can be completed with only bolts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A drive unit for an electric vehicle, comprising:
   a motor casing including a motor casing circumferential wall and end walls;
   a motor housed within said motor casing and including a stator fixed to said motor casing circumferential wall, a rotor disposed radially inward of said stator and a rotor shaft rotatably supporting said rotor and projecting through one end wall of said motor casing;

a gear casing formed separately from said motor casing and including a gear casing circumferential wall and end walls;

a gear unit housed within said gear casing for transmitting torque from said rotor shaft to wheels of the electric vehicle, said gear unit including a rotor-shaft-side gear having a diameter smaller than that of said rotor of said motor, a transmission shaft parallel to said rotor shaft and a large-diameter gear which is mounted on said transmission shaft and which is meshed with and driven by said rotor-shaft-side gear;

said motor casing having at least one motor casing fastening means, formed on said one end wall of said motor casing radially inward of said stator;

said gear casing having at least one gear casing fastening means formed on a portion of said gear casing circumferential wall, said portion of said gear casing circumferential wall surrounding the outer circumference of said rotor-shaft-side gear and located opposite said transmission shaft with respect to the rotor shaft; and a fastening element connecting said one motor casing fastening means and said one gear casing fastening means to each other.

2. A drive unit according to claim 1 wherein said one end wall of said motor casing has a socket defining a socket opening through which said rotor shaft extends and wherein one end face of said gear casing has a spigot defining spigot opening which receives one end of said rotor shaft, said rotor-shaft-side gear being mounted on said one end of said rotor shaft for rotation with said rotor shaft, said spigot being mated with said socket in joining said motor casing to said gear casing.

3. A drive unit according to claim 1 wherein said portion of said gear casing circumferential wall is contoured to the shape of said rotor-shaft-side gear.

4. A drive unit according to claim 1 wherein said one motor casing fastening means and said one gear casing fastening means are each in the form of a boss having a bolt hole therethrough and having a thickness greater than the thickness of the remainder of the respective casing.

5. A drive unit according to claim 4 wherein said boss of said motor casing projects axially inward into said motor casing from said one end wall.

\* \* \* \* \*